United States Patent [19]

Furusawa et al.

[11] Patent Number: 5,551,673
[45] Date of Patent: Sep. 3, 1996

[54] RESIN SHOCK ABSORBER

[75] Inventors: Hironobu Furusawa, Osaka; Tokio Kokubu, Ohtsu; Sakashi Kamata, Ohtsu; Hitoshi Ueno, Ohtsu, all of Japan

[73] Assignee: Toyo Boseki Kabushiki Kaisha, Japan

[21] Appl. No.: 349,903

[22] Filed: Dec. 6, 1994

[30] Foreign Application Priority Data

Mar. 30, 1994 [JP] Japan ..................................... 6-61342

[51] Int. Cl.$^6$ ..................................................... F16F 1/18
[52] U.S. Cl. ........................... 267/160; 267/165; 267/182
[58] Field of Search ................................. 267/136, 148, 267/153, 160, 164; 188/372; 248/632, 633, 634, 638; 293/136; 114/219, 220

[56] References Cited

U.S. PATENT DOCUMENTS

| 3,506,295 | 10/1968 | Yancey | 293/133 |
| 3,879,025 | 4/1975 | Dillard | 267/165 |
| 3,995,901 | 12/1976 | Filbert et al. | 267/153 |
| 5,280,890 | 1/1994 | Wydra | 267/153 |
| 5,409,200 | 4/1995 | Zingher et al. | 267/140 |

FOREIGN PATENT DOCUMENTS

0253023  10/1990  Japan ..................................... 267/158

Primary Examiner—Robert J. Oberleitner
Assistant Examiner—Chris Schwartz
Attorney, Agent, or Firm—Leydig, Voit & Mayer, Ltd.

[57] ABSTRACT

A resin shock absorber comprising a compression deformable portion made of a resin having a flexural modulus of elasticity of 500 to 20,000 kg/cm$^2$, said shock absorber having a yield strength of 2 to 25 kN/m$^2$ and a compressive energy absorption efficiency of 50% or higher. The shock absorber of the present invention has a high energy absorption efficiency for its reaction force, superior restorability, and is maintenance-free since the absorber has resistance against corrosion, water and weather. Therefore, the absorber is applicable to the use in the sea, on the ground, as well as above the ground. Furthermore, the shock absorber can be easily extended on demand into a block shock absorber, which is light in weight and simple in structure and capable of exhibiting uniform cushion characteristics over an extended area.

4 Claims, 9 Drawing Sheets

RESIN SHOCK ABSORBER

FIELD OF THE INVENTION

The present invention relates to a resin shock absorber with a wide range of applications, for example as the buffers to be set on places that require absorption and relaxation of impact energy, such as side walls of roads and wharves, bridge piers, floors and walls of buildings and automobiles.

BACKGROUND OF THE INVENTION

Conventional shock absorbers are metal springs, friction buffers, hydraulic buffers, rubber moldings, and combinations thereof. Metal springs show superior buffering performance but scarcely absorb energy. Friction buffers and hydraulic buffers generally have complicated structure and are expensive, as well as pose problems in terms of very high deformation rate-dependency and poor restorability. In addition, these buffers are restrictive of installation environment, since they are associated with difficulties in using in water and require maintenance against rust and water. Rubber moldings show high restorability, whereas suffer from low modulus of elasticity possessed by the constituent material. To achieve satisfactory shock absorption, therefore, the rubber moldings need to contain large amounts of rubbers to the extent that the resultant heavy weight of the rubber prevents realization of large-sized rubber moldings. While these conventional shock absorbers can be used beneficially for buffering a compression load applied over a small area, they are not suitable for the structures requiring a uniform cushion characteristic over a wide area, such as side walls of roads, and floors and walls of buildings.

In view of the above-mentioned problems of the prior art, an object of the present invention is to provide a resin shock absorber having a light weight, a simple structure, a high energy absorption efficiency for its reaction force, and superior restorability, which is maintenance-free as a result of its resistance against rust, water and weather, permitting its use both above the ground and in the sea; is extendably assembled as required; and is capable of achieving a uniform cushion characteristic over a wide area.

SUMMARY OF THE INVENTION

The present invention provides a shock absorber comprising portions deformable by compression (hereinafter referred to as "compression deformable portion" or "significantly deformable portion"), which are made of a resin having a flexural modulus of elasticity of 500 to 20,000 kg/cm². The absorber is characterized in that the deformation of the compression deformable portion permits the compressive stress-strain curve at the time of compression to meet the following requirements:
(a) a yield strength of from 20 to 250 kN/m2 ( 2 to 25 ton/m²) and
(b) a compressive energy absorption efficiency of 50% or higher.

It is preferable that the compression deformable portion (significantly deformable portion) of the shock absorber deform under a compressive load, and show a yield point at a compressive strain of 20% or lower.

DETAILED DESCRIPTION

The resin shock absorber of the present invention is made of a resin having a flexural modulus of elasticity of 500 to 20,000 kg/cm², preferably from 1,000 to 10,000. The absorber has a plurality of convex compression deformable portions. Among the resins having a flexural modulus of elasticity of 500 to 20,000 kg/cm² are thermoplastic polyester elastomer, polyolefin elastomer, polyamide elastomer, polyurethane elastomer, mixture thereof, and curable resins such as casting polyurethane. Particulaly preferable are thermoplastic polyester elastomer and polyolefin elastomer, which have excellent weatherability and water-resistance. However, any resin can be used as long as it has a flexural modulus of elasticity within the range specified above.

The use of a resin having a flexural modulus of elasticity of lower than 500 kg/cm² results in a shock absorber having an insufficient spring constant. For assuring a satisfactory energy absorption performance in this case, it is necessary to increase wall thickness of constituent elements, which in turn results in a bulky and heavy shock absorber, deviating from the object of the present invention.

On the other hand, the use of a resin having a flexural modulus of elasticity of higher than 20,000 kg/cm² results in too rigid a shock absorber without sufficient flexibility to stand repetitive use, due to possible stress concentration which causes easy breakage under compression load. If the thickness of the compression deformable portion is reduced in an attempt to decrease the rigidity, the flexibility of the shock absorber may be improved, but the constituent elements of the portion, when exposed to a large compression load, locally bend like paper to an unrecoverable degree to lose elasticity, again deviating from the object of the present invention.

In contrast, when a resin having a flexural modulus of elasticity of from 500 to 20,000 kg/cm$^2$ is used, the stress rise period of the shock absorber can be shortened, and the yield stress of the shock absorber can be increased as necessary by modifying the shape etc. of the compression deformable portions to be described later. Accordingly, a light weight shock absorber can be obtained without substantial increase in the wall thickness, unlike the conventional rubber moldings, and the shock absorber is free of easy breakage by stress concentration during compression.

The shock absorber of the present invention is afforded a structure that permits absorption of an impact energy by the entirety of the absorber, which is prepared from a resin having a flexural modulus of elasticity in the above-mentioned range into the shape to be described in the following.

Figure 1:
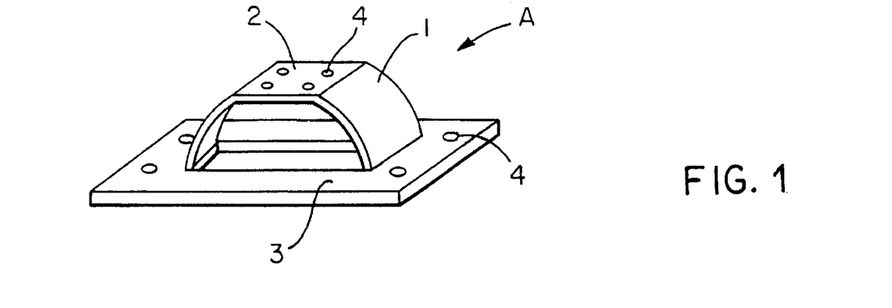
FIGS. 1–3 respectively show exemplary spring elements in the shock absorbers of the present invention.
Figure 2:
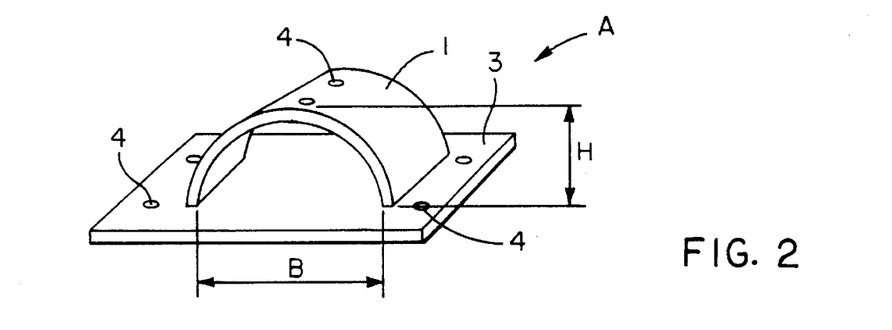
Figure 3:
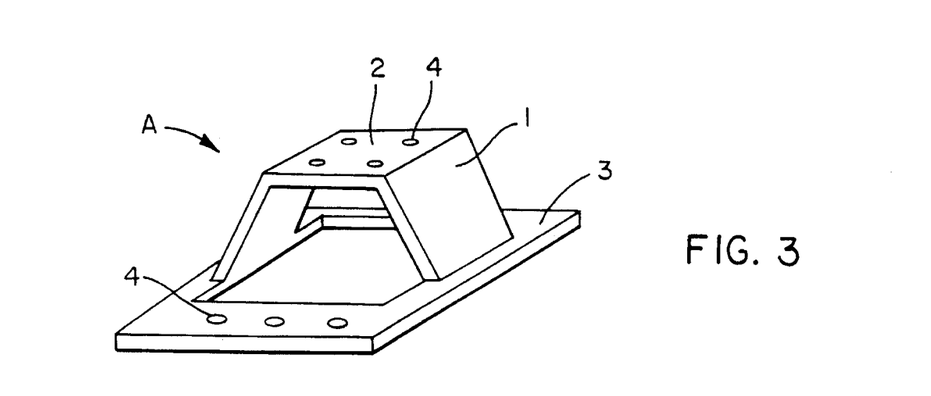
Figure 4:
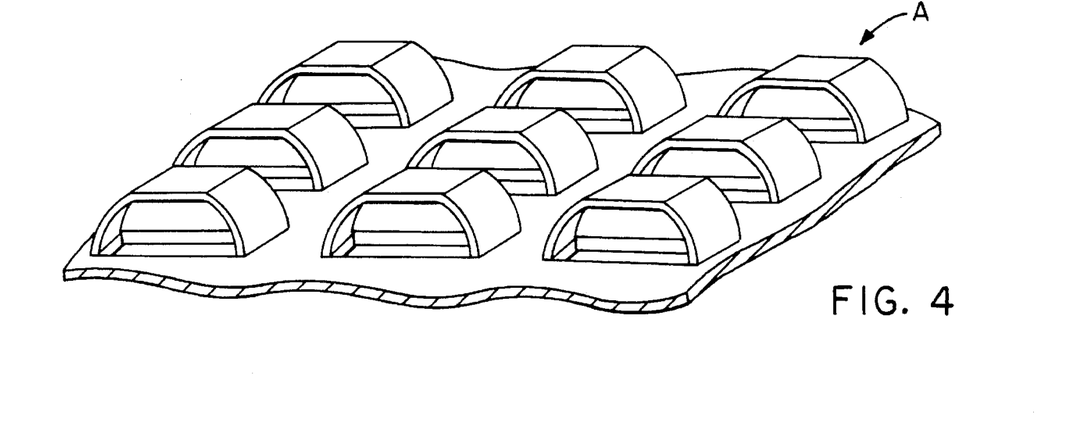
FIG. 4 shows one embodiment of the shock absorber of the present invention.

The shock absorber of the present invention comprises a spring element A shown in FIGS. 1 through 3. A compression deformable convex 1 may be of an arch, trapezoid, dome, or any other shape, and the shock absorber of the present invention can be realized, for example, by arranging multiple spring elements A in vertical and transverse directions, and integrally molding the elements into the structure as shown in FIG. 4 (partial side view of shock absorber). As occasion demands, a parallel portion 2 may be formed on the top of the compression deformable portion 1 of the spring element A, or a through-hole 4 may be drilled in the parallel portion 2 and/or a flat plate 3 of the spring element A, so that the integrally molded shock absorbers may be easily connected in such a way that the top of a compression deformable portion is laid on the top of another portion as shown in FIG. 6, and proper contact between the tops of compression deformable portions may be secured during compression of a shock absorber assembly.

Figure 5:
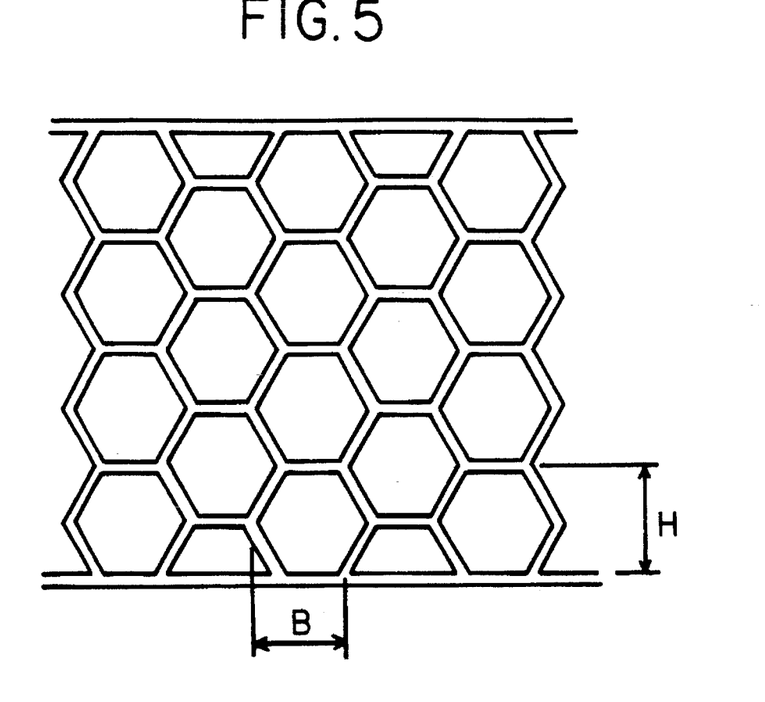
FIG. 5 shows one embodiment of a spring element in the shock absorber of the present invention.

In the spring element A shown in FIGS. 1 through 3, the flat plate 3 forms an impact energy-receiving part, and the compression deformable portion 1 forms a part which undergoes elastic deformation or buckling deformation to relax or absorb the impact energy. Therefore, the compression deformable portion 1 can be of any shape insofar as it contains legs or walls standing with inclination on the flat plate 3. Specifically, it may be of arc, trapezoid, arch or dome as illustrated in FIGS. 1 through 3. The compression deformable portion 1 may be formed into a honeycomb shape as shown in FIG. 5. Alternatively, a flat plate may be formed integrally on the top or the bottom of the compression deformable portion, so as to impart a shock absorbing capacity.

Figure 6:
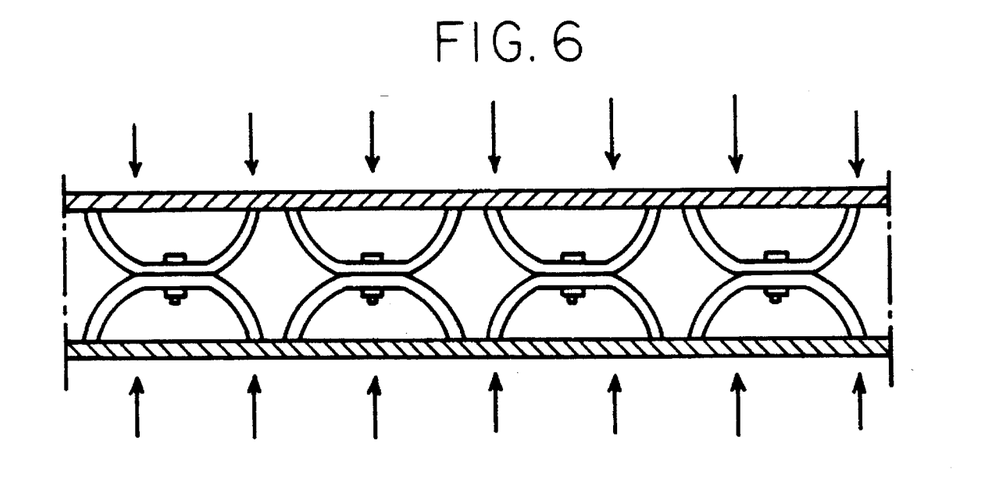
FIG. 6 is a side view of one embodiment of the shock absorber of the present invention.

In practical application of the shock absorber of the present invention, a pair of absorbers are joined on top of each other, as shown in FIG. 6, and the joined pairs of shock absorbers are piled in multiple layers as necessary, according to potential impact strength and impact frequency, which vary depending on application sites.

To achieve the object of the present invention, the shock absorber, in practical application, is required to have a yield strength of 2 to 25 kN/m$^2$ and a compressive energy absorption efficiency of 50% or higher, as read on the compressive stress-strain curve, when the absorber is compressed in the directions of arrows in FIG. 6.

Figure 7:
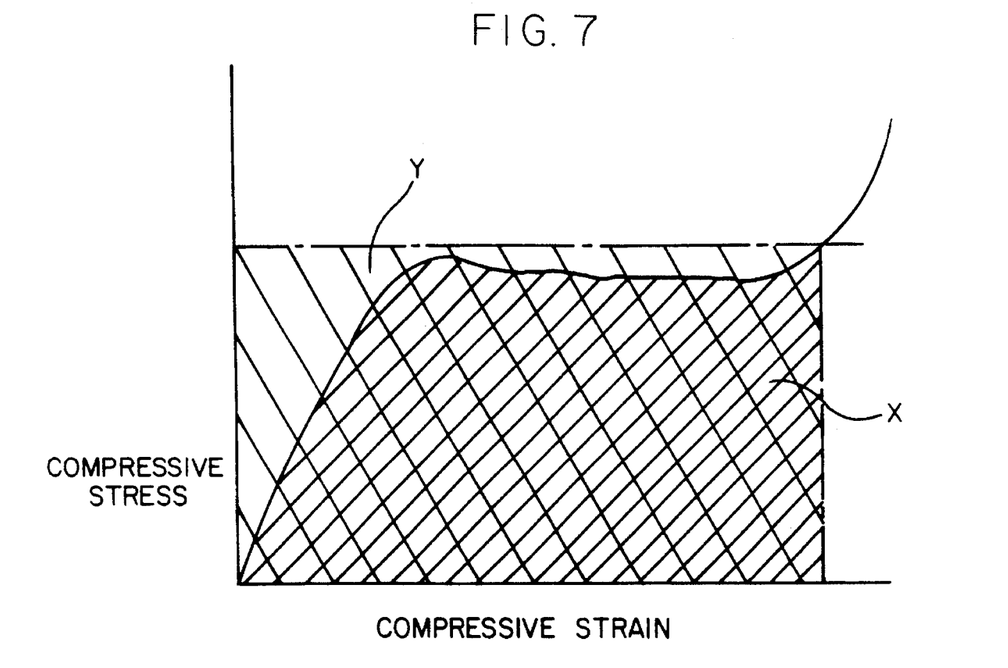
FIG. 7 shows a compressive stress-strain curve of the shock absorber of the present invention.

The compressive stress-strain curve (hereinafter referred to as "S—S curve") shows a correlation between stress (compressive load/load-receiving area) and compressive strain [decrease in length/original length×100%] when compressive load is applied to the top and bottom sides of the shock absorber, as shown in FIG. 7. In the initial stage of compression, the S—S curve rises sharply in approximate proportion to the compressive strain. Then, the curve draws a gradually rising curve until it reaches the yield point. At this point, the compression deformable portion of the shock absorber yields, so that the stress somewhat decreases or somewhat increases, depending on the shape of the compression deformable portion. When the shock absorber is compressed further, the S—S curve begins to rise sharply again due to reduced clearance in the spring element. At this stage, the stress shows a steep increase in response to even a minor increase in the compressive strain.

In the S—S curve, the yield strength corresponds to the maximal stress value (the stress at the point C), which is reached after the initial sharp rise of the curve. The compressive energy absorption efficiency corresponds to the percentage obtained by dividing the area X in FIG. 7 by the area Y in FIG. 7; the area X being the zone surrounded by the S—S curve and a perpendicular line drawn from a point in the final rise curve to the horizontal axis, wherein the point in the final rise curve is or corresponds to the maximum stress on the S—S curve between the yield point and the point, at which the ratio of increase in compressive stress/increase in compressive strain is 0.2 kN/m$^2$/%, and the area Y being the product of the compressive strain and the corresponding maximum stress value.

The yield strength does not necessarily coincide with the maximum stress. It is close to the maximum stress which the object collides against the shock absorber receives, and is considered a standard for the maximum stress. When the yield strength is insufficient, the shock absorber substantially does not function as an impact energy absorber. When the yield strength is excessively high, on the other hand, the shock absorber generates a large reaction force upon collision with an object, and cannot sufficiently relax the impact from the collided object. As is clear from the foregoing description, enhancing the compressive energy absorption efficiency requires the area X to be as close as possible to the area Y (that is, to make the shape of the area X as rectangular as possible). To this end, the initial rise of the S—S curve should be as steep as possible, and the stress reduction after the yield point should be minimized.

Various studies on the physical properties required of shock absorber of the present invention have revealed that sufficient relaxation of the impact energy, which does not cause an excessive reaction force to the collided objects, can be achieved when the yield strength of the shock absorber is between 2 and 25 kN/m$^2$, and the compressive energy absorption efficiency is 50% or higher, preferably 75% or higher. The shock absorber of the present invention satisfies these requirements.

Figure 8:
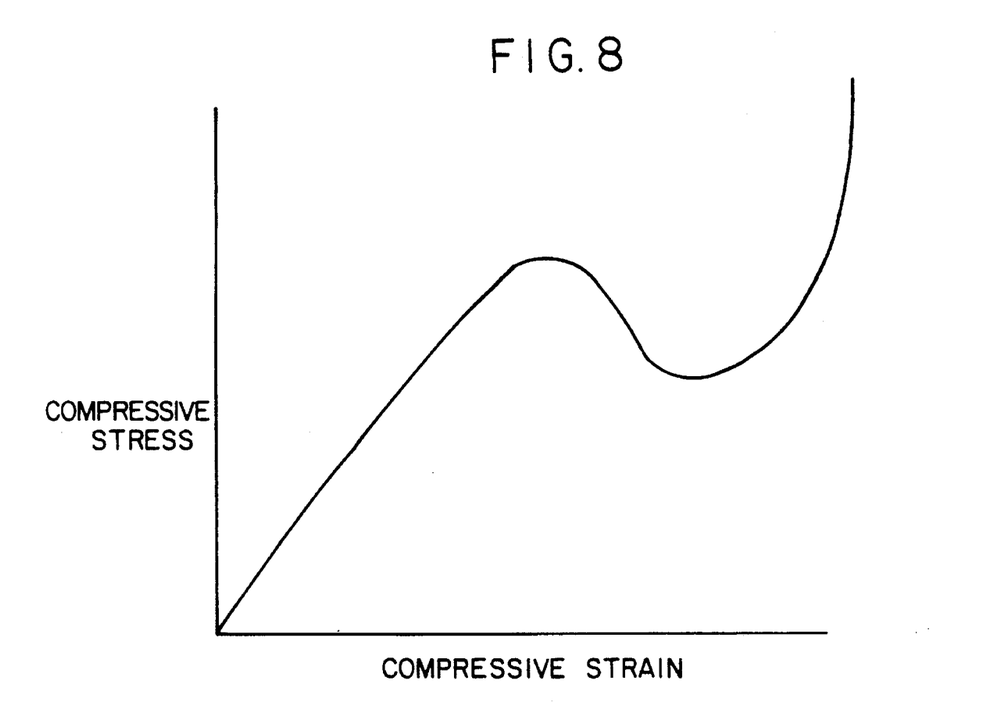
FIG. 8 shows a compressive stress-strain curve of a conventional shock absorber.

FIG. 8 shows the S—S curve of a conventional shock absorber such as a rubber molding. The initial rise of the curve is slow, and the yield point is relatively high, which means that the shock absorber generates a large reaction force when it yields. Furthermore, the stress shows a relatively large decrease after the yield point, and the final rise begins in response to a relatively small compressive strain.

Figure 10:
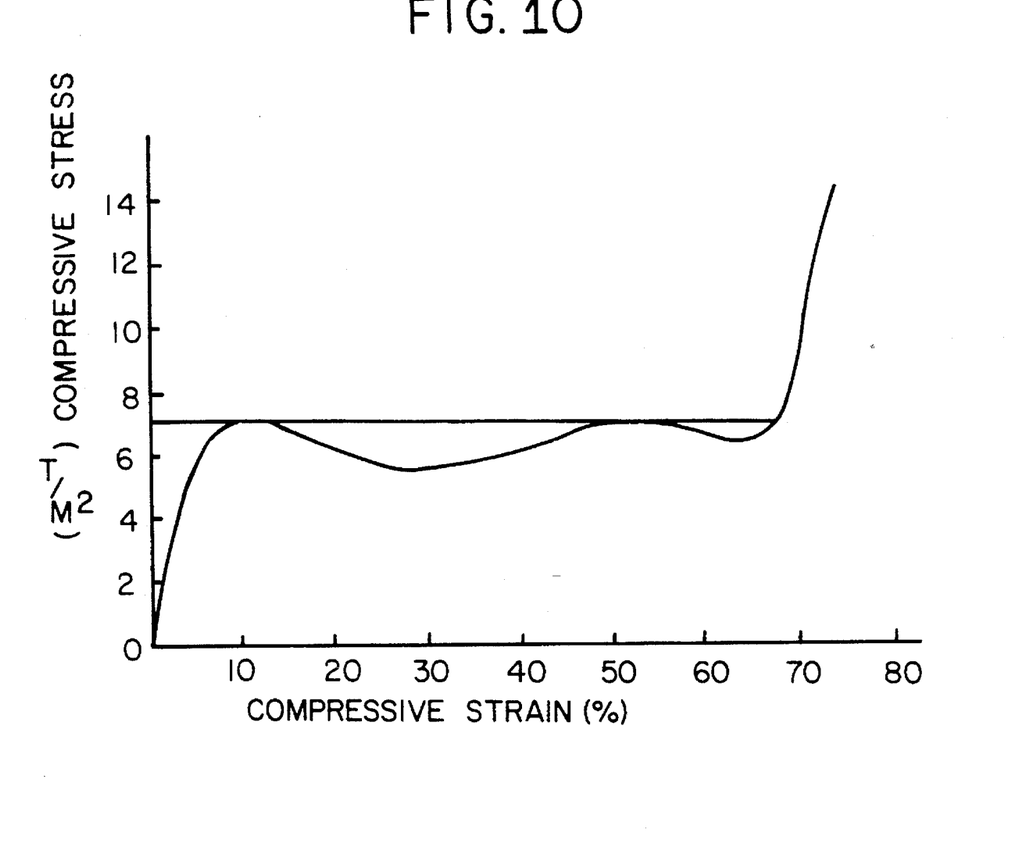
FIG. 10 shows a compressive stress-strain curve of the absorber of Example 1.

FIG. 10 shows the S—S curve of the shock absorber of the present invention, which is formed from a resin having a specific flexural modulus of elasticity and has the shape and structure as described above. The initial stress increase is steep, and the yield strength is desirable. After the yield point, the stress remains almost constant, regardless of increases in the compressive strain, until the final sharp rise. This suggests that the shock absorber has an extremely high compressive energy absorption efficiency of 50% or higher, or even 75% or higher. As mentioned earlier, the compressive energy absorption efficiency can be improved effectively when the initial S—S curve rises steeply. In this regard, it is preferable that the flexural modulus of elasticity of resin, as well as the shape and wall thickness of the compression deformable portion be determined in such a way that the S—S curve has a yield point at a compressive strain of 20% or lower, more preferably 15% or lower.

While FIG. 4 shows an example of the present invention, in which a plurality of spring elements having projecting (convex) compression deformable portions of the same shape and dimensions are arranged, multiple projecting compression deformable portions of two or more types different in shape and dimensions may be arranged discretionally. Alternatively, shock absorber units of different structures, which are composed of compression deformable portions with varying shapes and dimensions, may be placed on each other to form a block shock absorber. Furthermore, the shock absorber may be composed of compression deformable portions without flat plates. It is also possible to form the shock absorber by providing flat plates on top and/or bottom of the compression deformable portions.

The following paragraphs describe shock absorbers that do not have flat plates on which to arrange projecting compression deformable portions, and block shock absorbers composed of such absorbers, as examples that are light in weight and simple in assembly.

One example is a resin shock absorber, in which a plurality of corrugated shock absorbing strips of a specified width are connected with one another, so that projections and recessions (concaves) form, when viewed from the impact application side, a checkered pattern, the plurality of shock absorbing strips being connected integrally with one another at the center of the slant portion of corrugation, where the adjacent strips come into contact with each other.

This resin shock absorber desirably has a reinforcing frame provided integrally on the outside (or inside) of the shock absorbing strips (series of projections and recessions) at the approximate center.

A tensile breaking elongation according to ASTM D 638 of the resin used for the shock absorber is preferably 30% or higher, more preferably 100% or higher. The resin shock absorber can be formed by expansion molding.

The shock absorber of the invention can be formed by connecting the above-mentioned resin shock absorbers or those with reinforcing frames as arranged horizontally or vertically, or in both directions.

With such arrangement, an impact energy is dispersed on multiple projections arranged to form a checkered pattern. When the impact energy of a collided object works on the side face of the block shock absorber, the energy is dispersed over and absorbed by the multiple layers of shock absorbers, whereby the impact energy is relaxed.

The above-mentioned examples of resin shock absorbers are described in detail in the following with reference to FIGS. 13 through 19.

Figure 13:
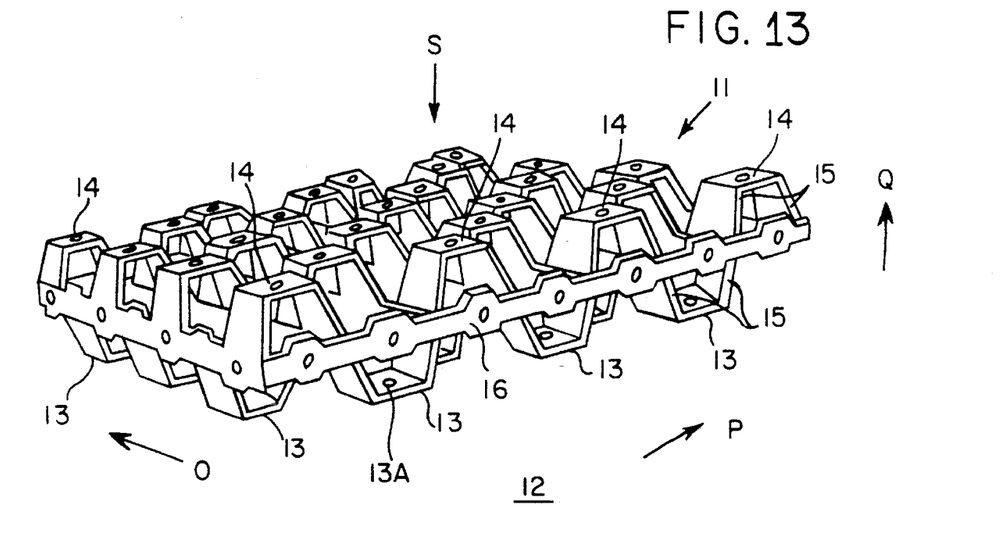
FIG. 13 is a perspective view of the absorber of the present invention.
Figure 14:
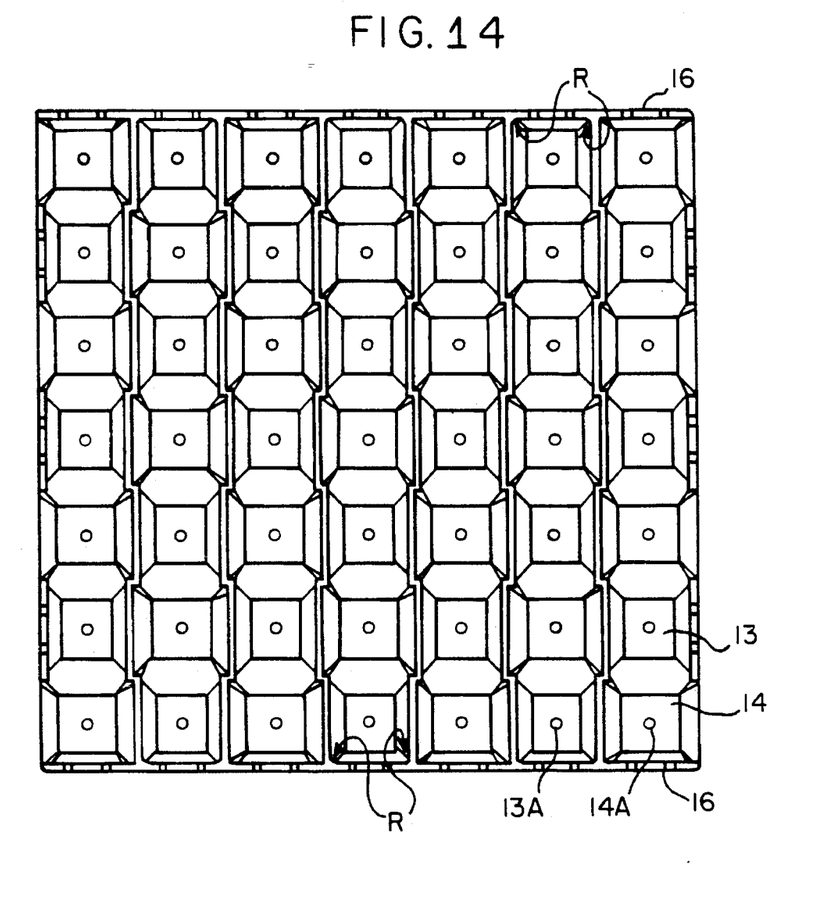
FIG. 14 is a plane view of the absorber of FIG. 13.

FIG. 13 shows an example of the resin shock absorber of the present invention. A resin shock absorber 11 comprises a plurality of fixing portions 13, as spaced apart from one another at specified intervals, to be secured to a flat surface 12 of a structure on which the absorber is to be mounted; a plurality of load receiving portions 14 provided on the impact application side in parallel relation with the fixing portions 13; and respective shock absorbing portions (compression deformable portions) 15 connecting the fixing portions 13 with the adjacent load receiving portion 14. The square fixing portions 13 and the square load receiving portions 14, thus connected via the rectangular shock absorbing portions 15, constitute a corrugated shock absorbing strip. A plurality of such shock absorbing strips are arranged in parallel relation to one another in the direction of O, so that convexes (projections) and concaves (recessions) form a checkered pattern when seen from the impact application side, and are integrally connected to one another at the center of the slant portion (denoted with 17 in FIG. 17) of the shock absorbing portions 15, thus constituting the resin shock absorber 11 having multilateral cells (denoted with 18 in FIG. 15). The shock absorber of the present invention is based on the above-mentioned structure. The reinforcement frame 16 shown in FIG. 14 is optional. Through-holes 13a and 14a are formed in the fixing portions 13 and load receiving portions 14, respectively. These holes are used to pass bolts for connecting resin shock absorbers 11 with one another.

Figure 15:
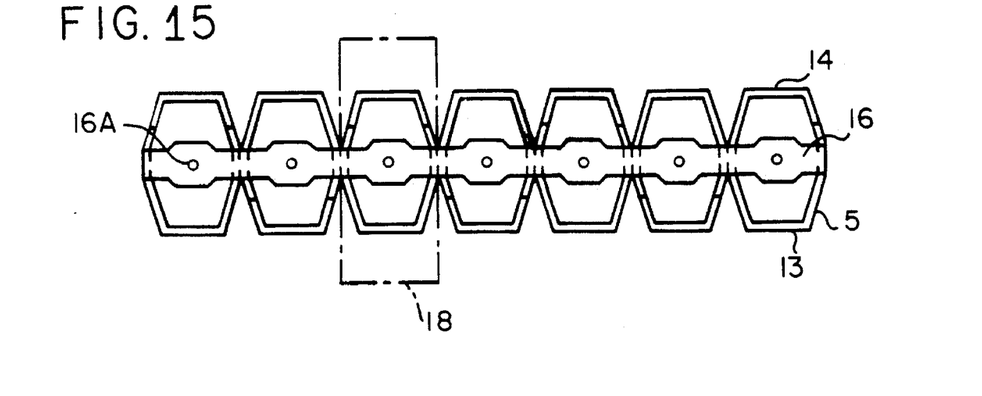
FIG. 15 is a front view of the absorber of FIG. 13.
Figure 16:
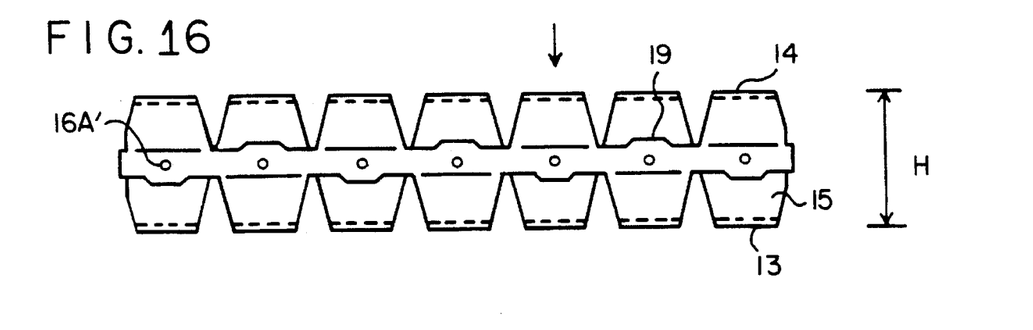
FIG. 16 is a right side view of the absorber of FIG. 13.
Figure 17:
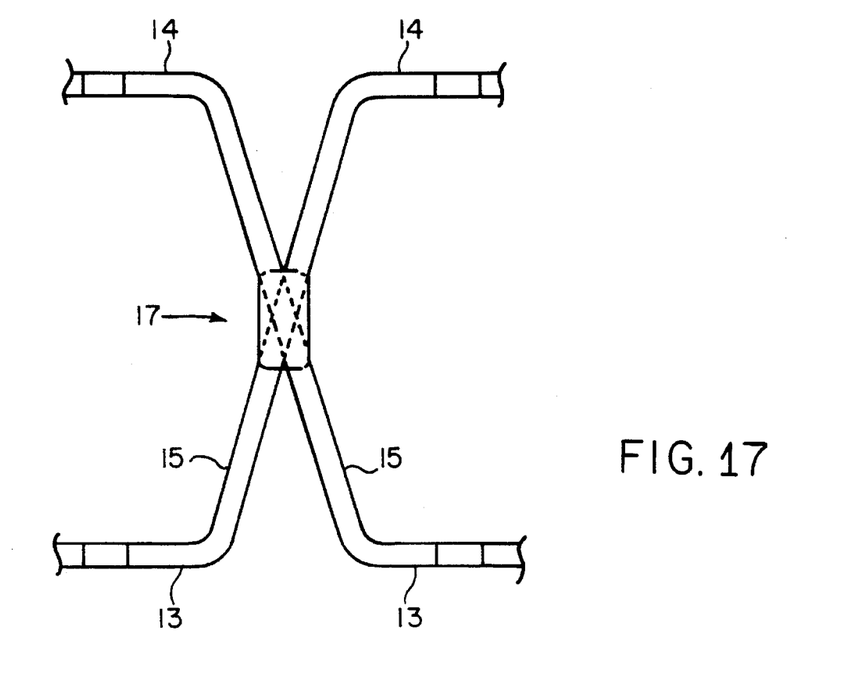
FIG. 17 is a partially magnified view showing the central portion of the slanted part of the absorber of the present invention.

FIGS. 14, 15 and 16 are plan view, front view and right side view, respectively, of the resin shock absorber 11. The multilateral cell 18 shown in FIG. 15 may be of any shape insofar as it is deformable by 70% (height under compression/original height (H) of cell×100) or more in the impact applying direction (the direction of arrow in FIG. 16, hereinafter referred to as "compressive direction" which is the direction of the height of the compression deformable portion.) and is made of a resin having a high flexural rigidity. From the aspects of simple shape-forming and easiness in increasing the flexural rigidity, a hexagonal shape as shown in FIG. 15 or octagonal shape (not shown) is preferable.

It is desirable that the slant shock absorbing portions 15 of each multilateral cell 18 be thicker at the center than the fixing portion 13 and load receiving portion 14. It is also desirable that a reinforcing frame 16 be provided around the resin shock absorber 11 at approximately the vertical center in the compressive direction. This reinforcement frame 16 restricts the multilateral cells 18 at their vertical center, as well as connects the shock absorbing strips arranged on the outmost periphery. The reinforcing frame 16 enhances impact energy absorption performance, without greatly increasing the weight of the resin shock absorber 11. In addition, it also saves the material when the flat plates are not used, and enables cost reduction. As shown in FIGS. 15 and 16, through-holes 16a or 16a' for connecting bolts are formed in the reinforcing frame 16, or in the center of each cell structure on the sides of the resin shock absorber 11. A protrusion 19 shown in FIG. 16 increases the strength of the area around each through-hole 16a'.

The number of projections and recessions which govern the size of each multilateral cell 18, is determined according to the size of objects expected to collide, in relation to the size of each cell 18, as well as the flexural rigidity of the resin. Specifically, the number of projections and recessions should be as small as possible, and within the range permitting the impact energy of a colliding object to be applied to and dispersed uniformly on the load receiving portions 14 of several cells 18. When the resin shock absorber 11 has a small number of projections and recessions, assembling of the absorber is facilitated. In addition, dust and foreign substances do not stay in the cell structure in the use environment, but are removed easily.

A resin or glass fiber belt or net may be inserted as a reinforcement in the resin shock absorber. When laminating resin shock absorbers to assemble a block resin shock absorber to be described later, a resin or glass fiber belt or net may be interposed between two adjacent absorbers to reinforce the absorber block.

By specifying the cell structure of the resin shock absorber and using a resin material with physical properties suitable for shock absorption, the resin shock absorber deforms by 50% or more under a compressive load in the height direction, and recovers to 90% or more of the original height when unloaded.

The resin shock absorber of the present invention may be molded by any method inclusive of injection molding, compression molding, and secondary forming from casting plate. For the production of a resin shock absorber having a thickness exceeding 10 mm and a weight more than 10 kg, expansion molding is costly beneficial. Resin shock absorbers formed by expansion molding have fine foams. However, these foams do not cause any problem in achieving the object of the present invention.

One of the applicable expansion molding methods comprises kneading a chemical foaming agent with a resin in advance, thereby enabling the resin to expand when molded. Another method involves extruding a mixture of $N_2$ gas and a molten resin, or a mixture of $N_2$ gas, a molten resin and a chemical foaming agent from an extruder, once storing the extruded mixture under pressurization, and then injecting the mixture into a mold. According to this molding method, the resin undergoes depressurization when the molten resin is injected into a mold, whereby fine $N_2$ gas bubbles present in the molten resin expand to achieve expansion.

When this molding method is employed, it is necessary to prevent large voids from being formed in a resultant product. To this end, the parts susceptible to thickness change must be designed such that the thickness change is slowly achieved to smooth the flow of the molten resin. Furthermore, the edges of notches must be rounded as indicated by "R" in FIG. 14, to prevent stress concentration. Formation of ribs for decreasing thickness is effective for reducing the weight of the absorber.

The following paragraphs describe the method of connecting resin shock absorbers so as to assemble a block shock absorber.

Examples of the method for connecting resin shock absorbers 11 longitudinally (in the direction of O in FIG. 13), transversely (in the direction of P) and in the laminating direction (in the direction of Q) include adhesive bonding, thermal fusion bonding, and connection with metal or plastic rivets or with bolts and nuts. The arrow S shows an impact strength-applying direction. Another method is to form connection holes for engaging projections or self-snapping protrusions and recessions in respective resin shock absorbers 11, so that the absorbers 11 can be joined transversely, longitudinally and in the laminating direction with a single quick motion. Shock absorbers 11 may be also joined by belting.

When the resin shock absorbers 11 are laminated, the shock absorbers 11 for the first layer are connected horizontally, and then the absorbers 11 for the second layer are laminated on the first layer, in such a manner that the absorbers 11 of the second layer stride over the boundaries of shock absorbers constituting the first layer. According to this method, shock absorbers 11 can be fixed by only connecting them in the locational relations in the laminating direction, without connection in the horizontal directions. The block shock absorber assembled by this method may have a space produced by disposing the second layer absorbers on the first layer absorbers in the manner mentioned above. It is preferable that this space be filled up with short shock absorbing members, so as to assure strength and good appearance. Assembly work efficiency can be improved by carrying in resin shock absorbers into work site upon setting plural absorbers horizontally and temporarily fixing same on a movable frame.

A block shock absorber can be also assembled as above even by using resin shock absorbers 11 without a reinforcement frame 16. In this case, it is preferable that a resin belt be extended from a row of load receiving portions to another row of load receiving portions so as to reinforce the connection in the direction O.

When a flat plate is laid over the shock absorbers (compression deformable portions), the flat plate serves as a reinforcement to prevent lowering in apparent spring constant in the compressive direction, which is caused by the compression deformable portions transversly laid flat when a compressive load (impact energy) is applied to the shock absorber. For effective reinforcement, the material of the flat plate is required to have a flexural modulus of elasticity of 50,000 $kg/cm^2$ or higher.

When the plates prepared from the material having such a high flexural modulus of elasticity are connected integrally with the shock absorbers, the compression deformable portions constituting the spring elements do not transversly lie flat even when compressive strain increases. Thus, the shock absorber exhibits superior impact absorbing capability, with entirely uniform deformation and enhanced restorability.

The flat plate may be made of any material, such as aluminum or the like metal, synthetic resin, and FRP (reinforced plastic). Considering the reinforcing effect, resistance to water and corrosion, moldability etc., FRP plate is most preferable. Reinforcing ribs may be provided on the flat plate as necessary to increase the rigidity, and holes may be formed in the plate to reduce the weight.

Figure 12:
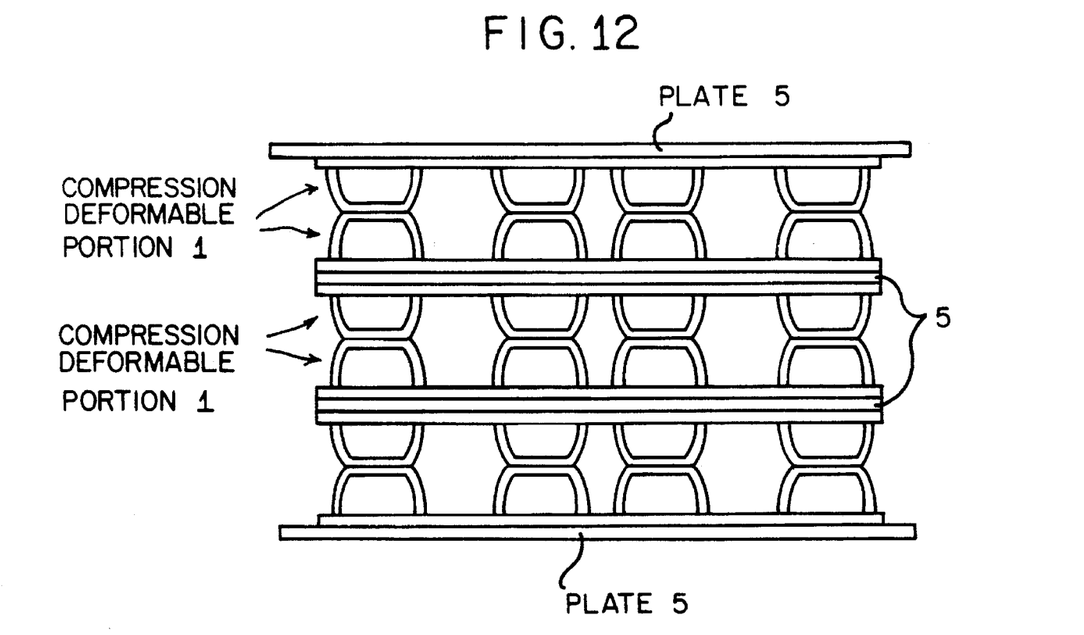
FIG. 12 is a side view showing a shock absorber comprising a flat plate.

A block shock absorber is fabricated by layering multiple shock absorbers and flat plates into an integrated body as shown in FIG. 12, to meet the impact energy absorption required by each application site. Examples of an integrating means include adhesive bonding, fusion bonding, connecting with metal or plastic rivets, bolts and nuts, and other methods for bonding or connecting in the above-below direction, longitudinal direction and transverse direction. The simplest is to form connection holes and engaging projections or self-snapping protrusions and recessions in the absorbers and flat plates, for joining the absorbers and flat plates transversely, longitudinally and to the height direction with a single quick motion.

As mentioned earlier, the compression deformable portion of the shock absorber is not restricted in shape, structure and thickness, and may be modified as appropriate according to the application site and application purposes. However, to attain the aforementioned yield strength and compressive energy absorption efficiency, as well as to reduce the weight and achieve high restorability after repetitive use, the configuration of the compression deformable portion is preferably such that the ratio of height H to span B (see FIG. 2) is between 0.3 and 1.5. When the H/B ratio is below 0.3, the height of the compression deformable portion becomes insufficient. This results in higher weight ratio of the flat plate portion, which in turn makes the weight reduction difficult to achieve. On the other hand, when the H/B ratio is over 1.5, the compression deformable portion becomes too tall to secure a sufficiently high flexural rigidity. Consequently, the compression deformable portion tends to lie down irregularly and have poor restorability.

To enhance the durability of the shock absorber of the present invention to stand the repetitive use thereof, the kind of resin, and shape and structure of the compression deformable portion are preferably determined such that they enable the shock absorber compressed by 50% or more in compression to recover to 90% or more of the original height when unloaded.

Some ships use rubber tires as a shock absorber. Likewise, rubber shock absorbers have been manufactured for other buffering purposes. However, these rubber shock absorbers are problematic in that they are heavy; they generate an excessive stress (reaction force) even under a small compressive load of the order of several percent; and they absorb a very little impact energy, which possibly causes damages to the objects that collide with the absorbers. In contrast, the shock absorber of the present invention absorbs impact energy extremely efficiently by the energy absorbing behavior of, so to speak, a dashpot and spring, which has been achieved by the combination of the viscoelastic characteristic of the resin having an appropriate flexural modulus of elasticity, and the specific shape and structure of the shock absorber. Accordingly, the absorber minimizes the damages of the colliding objects caused by the impact.

The shock absorber of the present invention can be manufactured by an optional method, such as injection molding, extrusion molding, and press molding. When an assembly of plural shock absorbers is desired, respective shock absorbers are assembled to a desired size by connecting them in the above-below directions, transverse direction and longitudinal direction with metal or plastic rivets. Alternatively, bolts or bosses and their engaging holes or recesses may be formed in advance in the absorber units, and the units may be connected by the bolts or by self-snapping. Another applicable method is to join shock absorbers integrally by thermal fusion bonding. The simplest and most preferred is to form connecting holes or self-snapping protrusions and recesses in each shock absorber unit, and assemble and extend the units in the longitudinal, transverse and height directions.

The resin shock absorber of the present invention can be attached to another structure by a conventional method; for example, by using bolts and holes formed in each flat plate portion of the shock absorber. Any other method may be used for this purpose.

The preferable types of resin to be used for the shock absorber of the present invention have been exemplified in the above. The resin quality may be improved by adding additives, such as stabilizers (e.g., antioxidant and UV absorber), pigments, carbon black, fillers (e.g., talc and glass beads), reinforcing fibers (e.g., metal fiber, glass fiber and carbon fibers), antistatic agent, plasticizer, flame retardant, foaming agent and release agent, as required according to the application and purpose.

As described above, the shock absorber of the present invention is made of a resin having a specific flexural modulus of elasticity, and has a specific shape and structure. As a result, the shock absorber of the present invention exhibits superior impact energy absorption performance; is light in weight; is easily extended into the size suitable for the application and purpose; and has superior resistance against corrosion, water and weather, be it used in the sea or above the ground. In view of these superior properties, the shock absorber of the present invention has a wide range of applications as an effective structure to provide a uniform cushion characteristic over a wide surface area, such as buffers on the side walls of roads and wharves, and cushion floors of buildings.

The invention is described more specifically in the following Examples, Comparative Examples and Reference Examples. It should be understood that the invention is not limited to these examples and that variations and modifications can be made without departing from the spirit and scope of the invention.

EXAMPLE 1

A shock absorber comprising eight compression deformable portions having an arch shape as shown in FIG. 2, the absorber measuring 21(width) cm×21(length) cm×3.3(height) cm, was injection-molded using a polyester elastomer "PELPRENE P-280B" (black) manufactured by Toyo Boseki Kabushiki Kaisha.

The absorber was vertically compressible by up to 80%. A plurality of the shock absorbers were joined longitudinally, horizontally and vertically via resin rivets to give a block shock absorber measuring 101 cm×101 cm×99 cm.

The advantageous features of the shock absorber of the present invention are to be clarified by reference to the obtained block shock absorber and Examples and Comparative Examples summarized in Table 1.

EXAMPLE 2

Shock absorbers were injection-molded from a polyolefin elastomer "SUMITOMO TPE3255" manufactured by Sumitomo Chemical Company, Limited, in the same manner as in Example 1 to give a block shock absorber.

EXAMPLE 3

Honeycomb-shaped shock absorbers shown in FIG. 5 were manufactured from the same resin as used in Example 1, "PELPRENE P-280B" (black).

COMPARATIVE EXAMPLE 1

Figure 9:
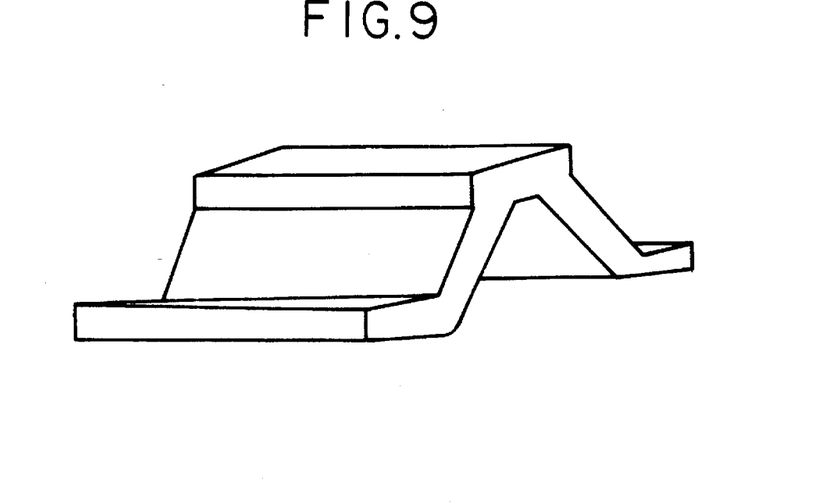
FIG. 9 is a perspective view of the spring element used for the shock absorber of Comparative Example 1.

Commercially available chloroprene shock absorbers injection-molded into the shape shown in FIG. 9 were used.

Evaluation results are shown in Table 1. Each evaluation item in the table is defined as follows:

Weight per unit volume: Weight (kg) of block shock absorber divided by its volume which is the product of maximum length (m), width (m) and height (m) of the block.

Flexural modulus of elasticity: Measured according to ASTM D790, the typical standard for flexural modulus of elasticity measurement.

Yield stress: Under a compressive load constant speed at 50 mm/min, the stress rises, in the initial stage of compression, sharply in approximate proportion with compressive strain, and then slows until it reaches the yield point, as shown in FIG. 7. Yield stress corresponds to the stress at this yield point.

Compressive strain at yield point (%): Percentage obtained by dividing the compressive displacement (cm) corresponding to the yield strength, by the original length (cm) in the compressive direction which is measured before compressing.

Compressive strain at final rise: Compressive strain at which the S—S curve in the final sharp rise stage reaches whichever the larger of the following stress value of (1) and (2):

(1) Yield strength (2) Maximum stress value reached by the S—S curve rising gradually after the yield point.

Compressive energy absorption efficiency (%): Percentage obtained by dividing the area surrounded by the S—S curve and a perpendicular line drawn from a point in the final rise curve to the horizontal axis, wherein the point in the final rise curve is or corresponds to the maximum stress on the S—S curve between the yield point and the point, at which the ratio of increase in compressive stress/increase in compressive strain is 0.2 kN/m$^2$/%, by the product of the compressive strain at the point where the curve initiates the final stress rise and the corresponding maximum stress value.

Absorbed energy per unit volume (kN·m/m$^3$): Amount of absorbed energy divided by the volume of shock absorber.

Absorbed energy per unit weight (kN·m/kN): Amount of absorbed energy divided by the weight of shock absorber.

Absorbed energy per unit volume/yield strength (reaction force) (kN·m/m$^3$/kN): Amount of absorbed energy per unit volume, divided by yield strength.

TABLE 1

|  | Example 1 | Example 2 | Example 3 | Comparative Example 1 |
|---|---|---|---|---|
| Material | P-280B | TPE3255 | P-280B | Rubber |
| Shape | Arch | Arch | Honeycomb | Arch |
| H (cm) | 3.3 | 3.3 | 4.3 | 100 |
| B (cm) | 5.7 | 5.7 | 3.75 | 94 |
| H/B | 0.58 | 0.58 | 1.15 | 1.06 |
| Weight (kg) | 130 | 104 | 125 | 1530 |
| Weight per unit volume (kg/m$^3$) | 130 | 104 | 115 | 500 |
| Load receiving area (m$^2$) | 1.0 | 1.0 | 1.0 | 0.6 |
| Flexural modulus of elasticity (kg/cm$^2$) | 5040 | 2000 | 5040 | — |
| Compressive strain at yield point (%) | 8 | 10 | 12 | 30 |
| Compressive strain at final rise (%) | 68 | 68 | 65 | 45 |
| Yield stress (KN/m$^2$) | 7 | 3 | 11 | 84 |
| Compressive energy absorption efficiency (%) | 80 | 75 | 85 | 74 |
| Absorbed energy per unit volume (KN · m/m$^3$) | 3.8 | 1.5 | 6.0 | 6.6 |
| Absorbed energy per unit weight (KN · m/T) | 29.2 | 14.4 | 52.2 | 11.2 |
| Absorbed energy per unit volume/yield strength (reaction force) (KN · m/m$^3$/T) | 0.54 | 0.50 | 0.55 | 0.19 |

As is clear from Table 1, the shock absorber of the present invention weighs lighter than conventional shock absorbers, and is capable of absorbing greater impact energy than do the conventional shock absorbers, while generating smaller reaction force. Furthermore, the shock absorber is applicable to the use in the sea, as well as above the ground, and is maintenance-free, due to its superior resistance against corrosion, water and weather.

Figure 11:
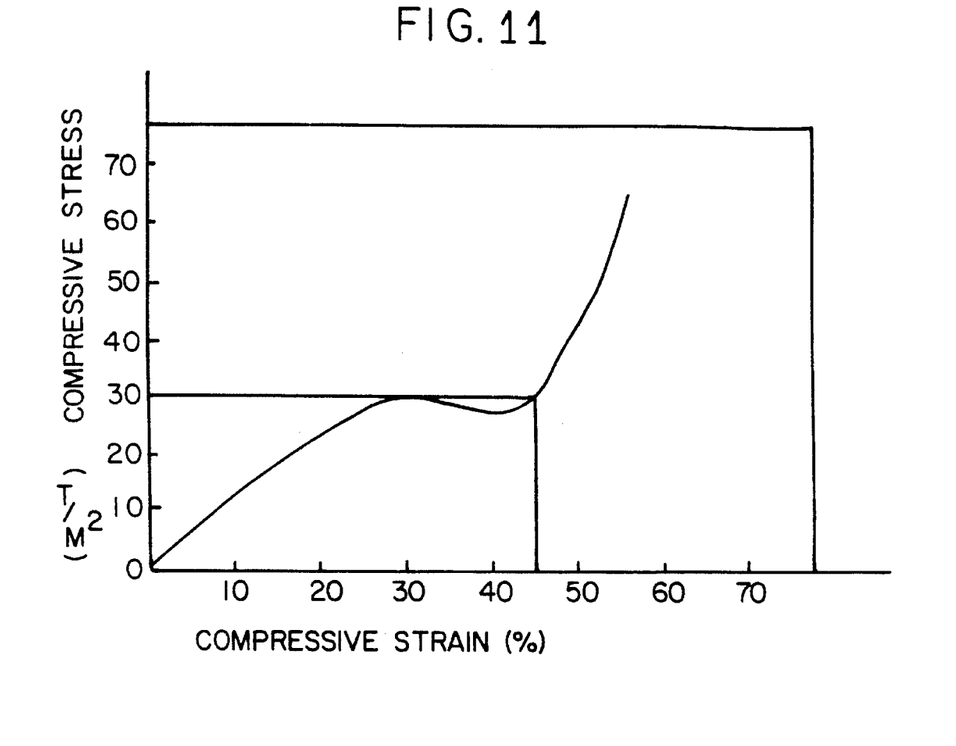
FIG. 11 shows a compressive stress-strain curve of the absorber of Comparative Example 1.

FIG. 10 is the S—S curve of the shock absorber of Example 1, and FIG. 11 is that of the shock absorber of Comparative Example 1. The shock absorber of Comparative Example 1 has a very high yield strength; generates an extremely large reaction force upon application of an impact; and shows a poor compressive energy absorption efficiency as evidenced from its S—S curve. In contrast, the shock absorber of Example 1 has an appropriate yield strength; does not generate extreme reaction force against collided objects; and has a high compressive energy absorption efficiency, with the S—S curve shape being closer to a rectangular shape, as compared with that of Comparative Example 1.

The shock absorber of Example 1 was installed on a concrete wall, and a one-ton vehicle was collided against the shock absorber at 10 km/h and at an incident angle of 10°. Although the bumper of the vehicle was somewhat damaged, the shock absorber restored to its original shape with no recognizable damage.

EXAMPLE 4

A resin shock absorber composed of cells hexagonal in shape when viewed from the front and trapezoid in cross section (as shown in FIGS. 15 and 16) was formed by N$_2$ gas low-pressure expansion-molding from a polyester elastomer "PELPRENE P-280B" (black) manufactured by Toyo Boseki Kabushiki Kaisha. The size of the absorber was 1(W) m×1(L) m×20(H) cm with mean rib thickness of 10 mm. The shock absorber had no reinforcing frames.

Each cell of the shock absorber comprised the top surface as a load-receiving surface and the bottom surface as a fixing surface, and the top and bottom surfaces were connected by shock absorbing portions. The cells were arranged to form a chekered pattern when the fixing surfaces and load-receiving surfaces are viewed from the impact application side. The resin shock absorbers thus formed were laminated in five layers, and connected using metal-insert resin bolts and nuts (with washers) to assemble a block shock absorber measuring 1(W)m×1(L)m×1(H) m.

EXAMPLE 5

The same block shock absorber as in Example 4 was assembled using the same resin shock absorbers as in Example 4, except that each shock absorber had a reinforcing frame provided at an approximately center (as shown in FIG. 13).

EXAMPLE 6

A block shock absorber was assembled by laminating, in 5 layers, the shock absorbers obtained in Example 4, which were provided with a reinforcing frame at an approximate center of every collision direction, inclusive of the outmost periphery.

Table 2 shows the evaluation results of the block shock absorbers of Examples 4 and 5. Each new evaluation item in the table is defined as follows.

Ratio of reactive element weight to assembly weight: Percentage obtained by dividing the weight of the element contributing to the reaction, by the weight of the block assembly. The element contributing to the reaction is considered to be the portion of each cell except the top and bottom surfaces, that is, the compression deformable portion.

Number of joints: The number of joints required to assemble a block shock absorber of 1 m respectively in width, length and height.

Flexural modulus of elasticity: Measured according to ASTM D790.

Tensile breaking elongation: Measured according to ASTM D 638.

Absorbed energy per unit volume (kN·m/m$^3$): The value obtained by dividing the amount of energy absorbed until the compressive reaction force reaches the specified value (20 kN/m$^2$ for Examples 4 and 5), by the volume of the shock absorber.

Absorbed energy per unit weight: The value obtained by dividing the amount of energy absorbed until the compressive reaction force reaches the specified value (20 kN/m$^2$ for Examples 4 and 5), by the weight of the shock absorber.

Recovery ratio (%): The percentage obtained by dividing the height of the block shock absorber, which was measured after the application and removal of a load to cause 80% compression, by the original height.

TABLE 2

|  | Example 4 | Example 5 | Example 6 |
|---|---|---|---|
| Material | P-150B | P-150B | P-150B |
| Shape (cell) | Hexagon | Hexagon | Hexagon |
| Weight per unit volume (kg/m$^3$) | 114 | 115 | 118 |
| Ratio of reactive element weight to assembly weight (%) | 84 | 80 | 82 |
| Number of joints (sets/m$^3$) | 98 | 98 | 98 |
| Flexural modulus of elasticity (kg/cm$^2$) | 3000 | 3000 | 3000 |
| Tensile breaking elongation (%) | 500 | 500 | 500 |
| Compressive strain at 20 T/m$^2$ (%) | 80 | 73 | 70 |
| Absorbed energy per unit volume (KN · m/m$^3$) | 3.8 | 7.6 | 9.9 |
| Absorbed energy per unit weight (KN · m/KN) | 33.3 | 66.1 | 83.9 |
| Recovery ratio (%) | 97 | 95 | 95 |
| Yield stress (KN/m$^2$) | 4 | 10 | 14 |
| Compressive energy absorption efficiency (%) | 70 | 75 | 78 |

As is apparent from Table 2, the shock absorbers of Examples 4, 5 and 6 are far lighter, are easier to assemble, and provide higher impact energy absorption performance than the conventional shock absorbers. The shock absorber with reinforcing frames (Example 5) particularly showed about twice as high impact energy absorption performance as do the conventional shock absorbers.

A shock absorber (Example 6), comprising resin shock absorbers equipped with a belt reinforcement at the approximate center in every direction of collision, exhibited greater shock energy absorption than did the shock absorber of Example 5.

Figure 18:
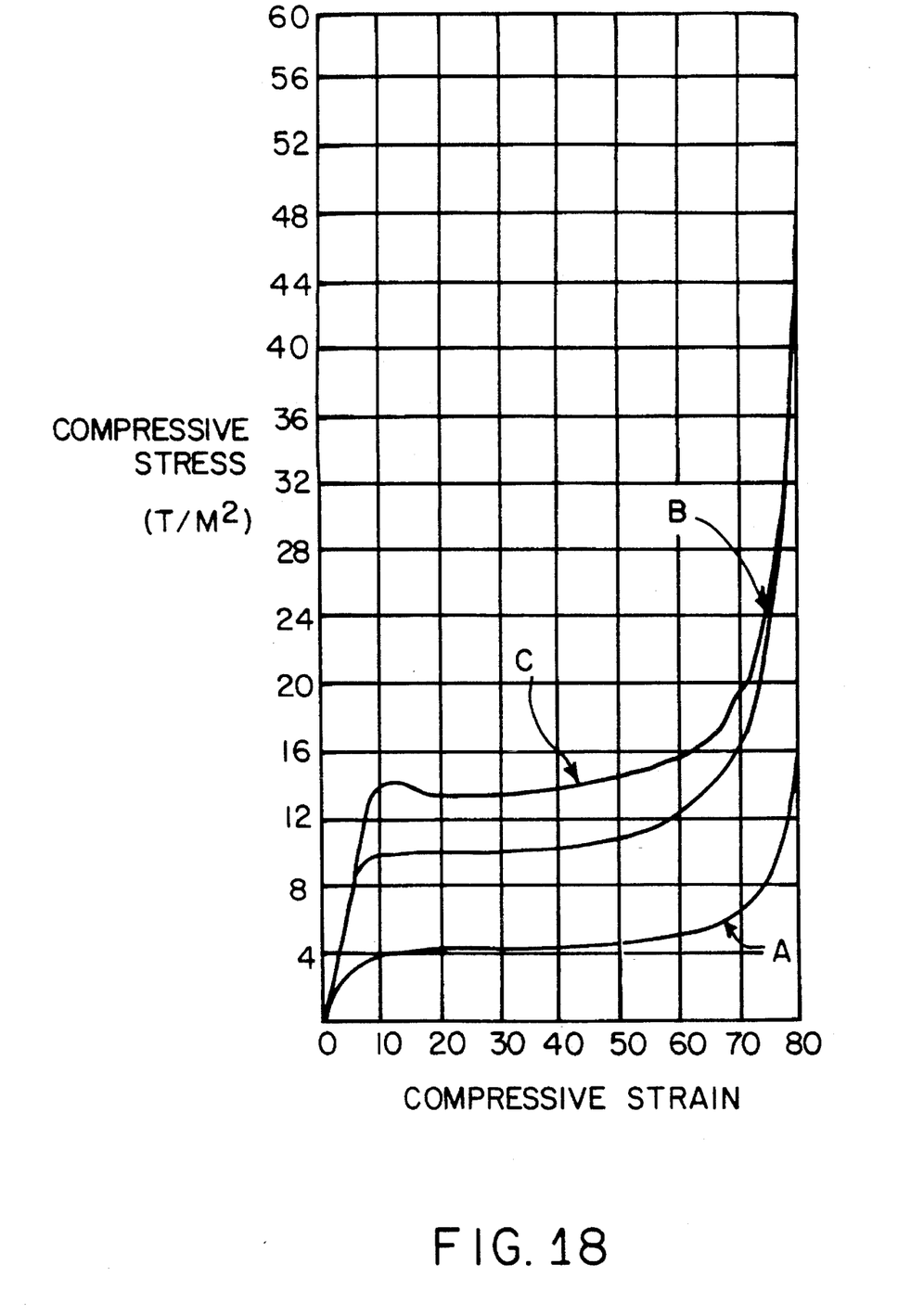
FIG. 18 shows compression characteristics of the absorber of Example 4 (a), Example 5 (b) and Example 6 (c).

FIG. 18 shows the compression characteristics of the shock absorbers of Examples 4, 5 and 6, wherein a corresponds to Example 4, b corresponds to Example 5 and c corresponds to Example 6. The S—S curves for these Examples do not show linear increase of stress and are suitably curved for shock absorption. Particularly, the shock absorber of Example 5 has an S—S curve showing sharp increase of stress in the initial stage of compression, and is suitable for absorbing relatively high impact energy.

Figure 19A:
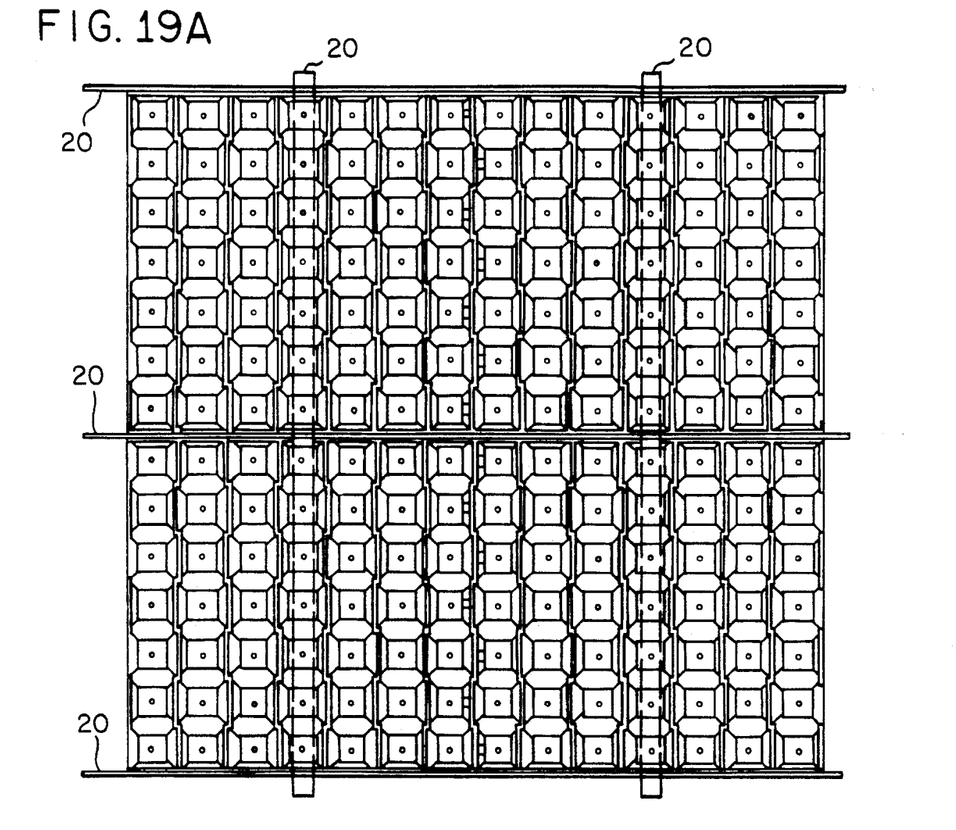
FIG. 19 shows one embodiment of the structure of a block shock absorber of the present invention.
Figure 19B:
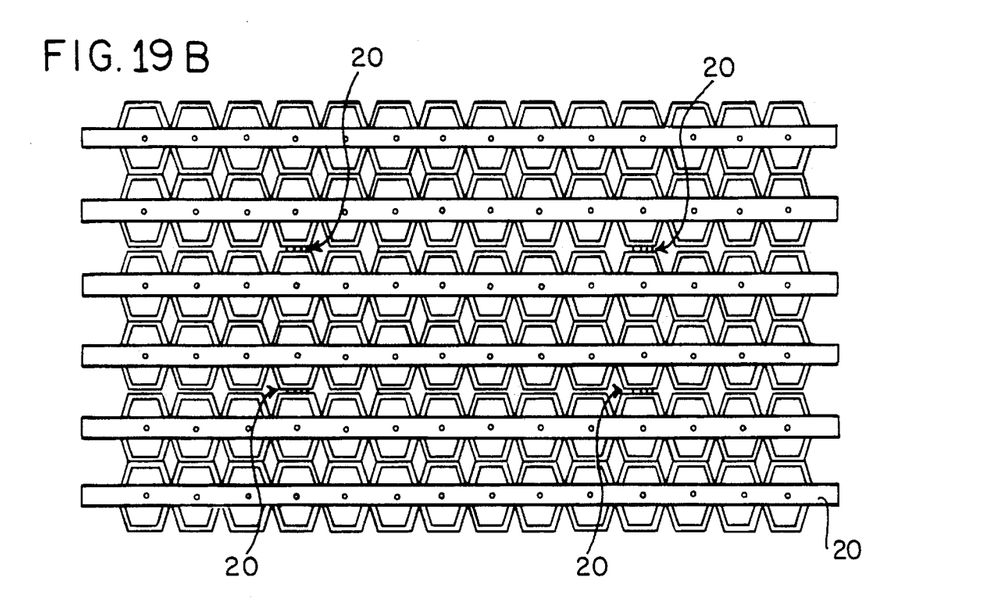

FIG. 19 shows another example of the block shock absorber of the present invention, wherein four resin shock absorbers, equipped with reinforcing frames as shown in Example 5, were arranged and connected horizontally [FIG. 19 (a)], and then laminated vertically in six layers [FIG. 19 (b)]. In total, the assembly comprises 24 shock absorbers. A resin belt 20 was provided for reinforcement of assembly or for joint reinforcement. Bolts and nuts used to assemble the block are not shown in FIG. 19.

In the present invention, the load-receiving part and the fixing part are disposed in a parallel relation, assuming that the structure exposed to collision impact has a flat face. For application of the absorber to a structure with a curved face, the load-receiving part and the fixed part may be curved likewise.

The shock absorber of the present invention can be directly installed on the surface of a structure to be protected against collision. For indirect installation, the shock absorber is mounted on a substrate board treated for imparting weatherability, then the substrate board carrying the shock absorber is attached to guide members fixed in advance on the surface of the structure.

According to the present invention, the projections and recessions of each corrugated shock absorbing strip are trapezoidal. The corrugation of the shock absorbing strip is not necessarily limited to this shape, and the shock absorbing portion may be curved like a gear tooth.

The shock absorber of the present invention is applicable as buffers on the site requiring absorption and relaxation of impact energy, such as side walls of roads and wharves, bridge piers, floors and walls of buildings, and automobiles.

Based on the foregoing description, it is evident that the shock absorber of the present invention has a high energy absorption efficiency for its reaction force and superior restorability, and is maintenance-free since the absorber has resistance against corrosion, water and weather. Therefore, the absorber is applicable to the use in the sea, on the ground, as well as above the ground. Furthermore, the shock absorber can be easily extended on demand into a block shock absorber, which is light in weight and simple in structure and capable of exhibiting uniform cushion characteristics over an extended area.

What is claimed is:

1. A resin shock absorber comprising a compression deformable portion made from a resin having a flexural modulus of elasticity of 500–20,000 kg/cm$^2$, said shock absorber having a yield strain of 2–25 kN/m$^2$ and a compressive energy absorption efficiency of 50% or higher, wherein said shock absorber includes an impact application side, wherein said compression deformable portion has a yield point at a compressive strain of 20% or lower, wherein said shock absorber comprises a plurality of corrugated, long shock absorber strips of a specific width, said corrugated, long shock absorber strips including a plurality of slant portions defining a plurality of alternating convexes and concaves, wherein said convexes and concaves are arranged in such a way that said convexes and concaves form a checkered pattern when seen from the impact application side, said plurality of shock absorber strips being connected integrally with one another at the vertical center of the slant portion of the strips where the strips come into contact with each other.

2. The resin shock absorber of claim 1, wherein reinforcing frames are integrally installed on the side of the convexes and concaves.

3. The resin shock absorber of claim 1, wherein a tensile break elongation of the resin forming the compression deformable portion is 30% or higher.

4. A resin shock absorber according to claim 1, wherein said resin shock absorber deforms by 50% or more under a compressive load in the height direction, and recovers to 90% or more of the original height when unloaded.

* * * * *

UNITED STATES PATENT AND TRADEMARK OFFICE
CERTIFICATE OF CORRECTION

PATENT NO. : 5,551,673
DATED : September 3, 1996
INVENTOR(S) : Furusawa et al.

Page 1 of 2

It is certified that error appears in the above-identified patent and that said Letters Patent is hereby corrected as shown below:

ON THE TITLE PAGE:
[57] Abstract:
In line 4, "2 to 25" should read --20 to 250--.

In Column 1; line 55: "( 2" should read --(2--.
In Table 1, lines 12, 15, 16, and 18: "KN" should read --kN--.
In Table 2, line 10: "T/" should read --kN/--.
In Table 2, line 13: "KN" should read --kN--.
In Table 2, line 15: "(KN · m/KN)" should read --(kNf · m/kN)--.
In Table 2, line 17: "(KN/" should read --kN--.
In Column 3, line 59: "2 to 25" should read --20 to 250--.
In Column 4, line 24: "0.2" should read --2--.
In Column 4, line 49: "2 and 25 should read --20 and 250--.
In Column 11, line 8: "0.2" should read --2--.
In Table 1, line 12: "7, 3, 11, and 84" should read --70, 30, 110, and 840--.
In Table 1, line 15: "3.8, 1.5, 6.0, 6.6" should read --38, 15, 60, 66--.
In Column 13, line 10: "(20 kN/ " should read --(200 kN/--.
In Column 13, line 14: "(20" should read --(200--.

UNITED STATES PATENT AND TRADEMARK OFFICE
CERTIFICATE OF CORRECTION

PATENT NO. : 5,551,673
DATED : September 3, 1996
INVENTOR(S) : Furusawa et al.

It is certified that error appears in the above-identified patent and that said Letters Patent is hereby corrected as shown below:

In Table 2, line 10: "80, 73, 70" should read
--800, 730, 700--.
In Table 2, line 17: "4, 10, 14" should read
--40, 100, 140--.
In Claim 1, line 4: "2-25" should read
--20-250--; also "strain" should read --strength--.

Signed and Sealed this

Twenty-fifth Day of March, 1997

BRUCE LEHMAN

Attest:

Attesting Officer

Commissioner of Patents and Trademarks